United States Patent
Kim et al.

(10) Patent No.: US 9,753,827 B2
(45) Date of Patent: Sep. 5, 2017

(54) METHOD AND APPARATUS FOR IDENTIFYING EXTERNAL DEVICE

(71) Applicant: Samsung Electronics Co., Ltd., Gyeonggi-do (KR)

(72) Inventors: Chul-Kwi Kim, Seoul (KR); Woo-Jin Jung, Gyeonggi-do (KR)

(73) Assignee: Samsung Electronics Co., Ltd., Yeongtung, gu, Suwon-si, Gyeonggi-do (KR)

(*) Notice: Subject to any disclaimer, the term of this patent is extended or adjusted under 35 U.S.C. 154(b) by 22 days.

(21) Appl. No.: 14/805,613

(22) Filed: Jul. 22, 2015

(65) Prior Publication Data

US 2016/0026551 A1 Jan. 28, 2016

(30) Foreign Application Priority Data

Jul. 22, 2014 (KR) .................. 10-2014-0092400

(51) Int. Cl.
| | |
|---|---|
| *G06F 1/00* | (2006.01) |
| *G06F 1/24* | (2006.01) |
| *G06F 11/30* | (2006.01) |
| *G06F 11/22* | (2006.01) |
| *G06F 1/26* | (2006.01) |
| *G06F 1/28* | (2006.01) |

(52) U.S. Cl.
CPC .......... *G06F 11/3051* (2013.01); *G06F 1/263* (2013.01); *G06F 1/266* (2013.01); *G06F 1/28* (2013.01); *G06F 11/2289* (2013.01); *G06F 11/3041* (2013.01)

(58) Field of Classification Search
CPC ............................. G06F 1/32; G06F 11/3051
See application file for complete search history.

(56) References Cited

U.S. PATENT DOCUMENTS

| | | | | |
|---|---|---|---|---|
| 2002/0169915 | A1* | 11/2002 | Wu ...................... | G06F 13/4081 710/305 |
| 2009/0009187 | A1* | 1/2009 | Kwak ................. | G06F 13/4081 324/630 |
| 2010/0125793 | A1* | 5/2010 | Hayashi ................. | G03B 31/00 715/716 |
| 2014/0070791 | A1* | 3/2014 | Funakoshi ............. | G01R 19/00 324/76.11 |

FOREIGN PATENT DOCUMENTS

KR 10-1310290 B1 9/2013

\* cited by examiner

*Primary Examiner* — Mohammed Rehman
(74) *Attorney, Agent, or Firm* — Cha & Reiter, LLC.

(57) ABSTRACT

Provided is a method and apparatus for identifying a type of an external device connected to an interface connector in an electronic device. The electronic device may measure a voltage of power that is input to a power supply terminal of the interface connector that includes the power supply terminal and is configured to connect with an external device. The electronic device may identify a type of the external device connected to the interface connector based on the voltage of the input power. In addition, other embodiments are also possible.

14 Claims, 9 Drawing Sheets

METHOD AND APPARATUS FOR IDENTIFYING EXTERNAL DEVICE

CLAIM OF PRIORITY

This application claims the benefit under 35 U.S.C. §119(a) of a Korean patent application filed in the Korean Intellectual Property Office on Jul. 22, 2014 and assigned Serial No. 10-2014-0092400, the entire disclosure of which is incorporated herein by reference.

TECHNICAL FIELD

The present disclosure relates to a method and apparatus for identifying an external device connected to an electronic device in the electronic device.

BACKGROUND

A variety of external devices (e.g., a charging device, a personal computer (PC), a car charging dock, a charging-compatible speaker and the like) may be connected to various electronic devices, (e.g., a smart phone, a tablet PC, a wearable device and the like). The electronic device and the external device may each include an interface connector for connecting with each other. The electronic device may identify the type of the external device connected thereto through the interface connector, and support an interface corresponding to the external device of the identified type.

The interface connector may include an identification (ID) terminal that the electronic device can use in identifying the external device. An example of the interface connector with an ID terminal may include a 5-pin interface connector that has a power supply terminal VBUS, two communication terminals D+ and D−, a ground terminal GND, and an ID terminal.

The electronic device is subjected to a process test in the manufacturing process. A process test tool for the process test may be connected to the electronic device through the interface connector. The process test tool may include a pull-down resistor with a specific resistance, which is connected to an ID terminal of the interface connector. Upon detecting that the pull-down resistor with a specific resistance is connected to the ID terminal of the interface connector, the electronic device may determine that the external terminal connected to the interface connector is a process test tool.

As described above, the ID terminal of the interface connector is used to identify the type of the external electronic device. Some of the various electronic devices may use the ID terminal only for determining whether the process test tool is connected thereto. In these electronic devices, the ID terminal may not be used in the situation where the electronic devices are used by the user. If the interface connector includes the ID terminal, the mounting space of the interface connector may increase and the part price may increase, compared with an interface connector including no ID terminal.

The above information is presented as background information only to assist with an understanding of the present disclosure. No determination has been made, and no assertion is made, as to whether any of the above might be applicable as prior art with regard to the present disclosure.

SUMMARY

An aspect of the present disclosure is to address at least the above-mentioned problems and/or disadvantages and to provide at least the advantages described below. Accordingly, an aspect of various embodiments of the present disclosure is to provide a method and apparatus in which an electronic device can identify a type of an external device connected to the electronic device, while connecting the electronic device and the external device with each other using an interface connector that does not include an ID terminal.

Another aspect of various embodiments of the present disclosure is to provide a method and apparatus in which an electronic device can determine whether a type of an external device connected to the electronic device is a process test tool, while connecting the electronic device and the external device with each other using an interface connector that does not include an ID terminal.

In accordance with an aspect of the present disclosure, there is provided a method for identifying an external device in an electronic device. The method may include measuring a voltage of power that is input to a power supply terminal of an interface connector that includes the power supply terminal and is configured to connect with an external device; and identifying a type of the external device connected to the interface connector based on the voltage of the input power.

In accordance with another aspect of the present disclosure, there is provided an electronic device, which includes an interface connector that includes a power supply terminal and is configured to connect with an external device; and a controller configured to measure a voltage of power that is input to the power supply terminal, and identify a type of the external device connected to the interface connector based on the voltage of the input power.

In accordance with further another aspect of the present disclosure, there is provided a computer-readable recording medium storing a program to be performed in a computer. The program may include an executable instruction that, when is executed by a processor, allows the processor to perform an operation of measuring a voltage of power that is input to a power supply terminal of an interface connector that includes the power supply terminal and is configured to connect with an external device, and an operation of identifying a type of the external device connected to the interface connector based on the voltage of the input power.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

The above and other aspects, features and advantages of certain exemplary embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
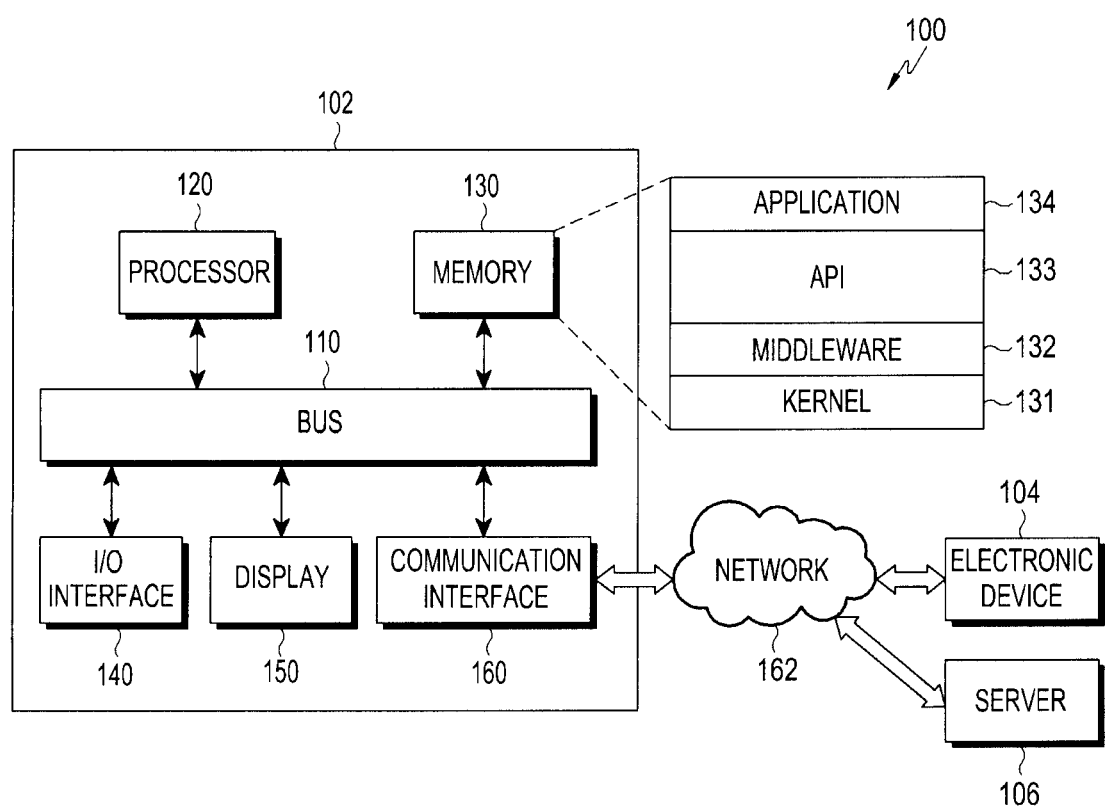
FIG. 1 is a block diagram illustrating a network environment including an electronic device according to various embodiments of the present disclosure.

Hereinafter, embodiments of the present disclosure are described with reference to the accompanying drawings. Various changes may be made to the present disclosure, and the present disclosure may come with a diversity of embodiments. Some embodiments of the present disclosure are shown and described in connection with the drawings. However, it should be appreciated that the present disclosure is not limited to the embodiments, and all changes and/or equivalents or replacements thereto also belong to the scope of the present disclosure. The same or similar reference denotations are used to refer to the same or similar elements throughout the specification and the drawings.

The terms "comprise" and/or "comprising" as herein used specify the presence of disclosed functions, operations, or components, but do not preclude the presence or addition of one or more other functions, operations, or components. It will be further understood that the terms "comprise" and/or "have," when used in this specification, specify the presence of stated features, integers, steps, operations, elements, and/or components, but do not preclude the presence or addition of one or more other features, integers, steps, operations, elements, components, and/or groups thereof.

As used herein, the term "A or B" or "at least one of A and/or B" includes any and all combinations of one or more of the associated listed items. For examples, "A or B" or "at least one of A or/and B" each may include A, or include B, or include both A and B.

Ordinal numbers as herein used, such as "first", "second", etc., may modify various components of various embodiments, but do not limit those components. For example, these terms do not limit the order and/or importance of the components. These terms are only used to distinguish one component from another. For example, a first user device and a second user device are different user devices from each other. For example, according to various embodiments of the present disclosure, a first component may be denoted a second component, and vice versa without departing from the scope of the present disclosure.

When a component is "connected to" or "coupled to" another component, the component may be directly connected or coupled to the other component, or other component(s) may intervene therebetween. In contrast, when a component is "directly connected to" or "directly coupled to" another component, no other intervening components may intervene therebetween.

The terms as used herein are provided merely to describe some embodiments thereof, but not to limit the present disclosure. It is to be understood that the singular forms "a," "an," and "the" include plural references unless the context clearly dictates otherwise.

Unless otherwise defined, all terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

An electronic device according to various embodiments of the present disclosure may include at last one of, for example, a smart phone, a tablet personal computer (PC), a mobile phone, a video phone, an e-book reader, a desktop PC, a laptop PC, a netbook computer, a personal digital assistant (PDA), a portable multimedia player (PMP), an MPEG-1 audio layer-3 (MP3) player, a mobile medical device, a camera, or a wearable device (e.g., a head-mounted-device (HMD) such as electronic glasses, electronic clothing, electronic bracelet, electronic necklace, E-App accessory (or appcessory), electronic tattoo, or smart watch).

In some embodiments, the electronic device may be a smart home appliance. The smart home appliance may include at least one of, for example, television (TV), a digital video disk (DVD) player, an audio player, a refrigerator, an air conditioner, a cleaner, an oven, a microwave oven, a washer, an air purifier, a set-top box, a TV box (e.g., Samsung HomeSync™, Apple TV™, or Google TV™), game consoles, an electronic dictionary, an electronic key, a camcorder or an electronic photo frame.

In some embodiments, the electronic device may include at least one of various medical devices (e.g., magnetic resonance angiography (MRA), magnetic resonance imaging (MRI), computed tomography (CT), a medical camcorder, a medical ultrasonic device and the like), a navigation device, a global positioning system (GPS) receiver, an event data recorder (EDR), a flight data recorder (FDR), an automotive infotainment device, a marine electronic device (e.g., a marine navigation device, a marine gyro compass and the like), an avionics, a security device, a car head unit, an industrial or household robot, an automatic teller's machine (ATM) for banks, or a point of sales (POS) for shops.

In some embodiments, the electronic device may include at least one of a part of the furniture or building/structure, an electronic board, an electronic signature receiving device, a projector or various meters (e.g., meters for water, electricity, gas or radio waves), each of which includes a communication function.

The electronic device according to various embodiments of the present disclosure may be one or a combination of the above-described various devices. Further, the electronic device according to various embodiments of the present disclosure may be a flexible device. It will be apparent to those of ordinary skill in the art that the electronic device according to various embodiments of the present disclosure is not limited to the above-described devices.

As used herein, the term 'user' may refer to a person who uses the electronic device, or a device (e.g., an intelligent electronic device) that uses the electronic device.

FIG. 1 illustrates a network environment 100 including an electronic device 102 according to various embodiments of the present disclosure.

Referring to FIG. 1, the electronic device 102 may include a bus 110, a processor 120, a memory 130, an Input/Output (I/O) interface 140, a display 150 and a communication interface 160. The bus 110 may be a device for connecting components of the electronic device 102 with each other, and delivering communication information (e.g., a control message) between the components.

The processor 120 may, for example, receive a command from other components (e.g., the memory 130, the I/O interface 140, the display 150, the communication interface 160 and the like) through the bus 110, decode the received command, and perform an operation associated with the decoded command or data processing.

The memory 130 may store the command or data that is received from or generated by the processor 120 or other components (e.g., the I/O interface 140, the display 150, the communication interface 160 and the like). The memory 130 may include, for example, programming modules such as a kernel 131, a middleware 132, an application programming interface (API) 133 or an application(s) 134. Each of the programming modules may be configured by software, firmware, hardware or a combination thereof.

The kernel 131 may control or manage the system resources (e.g., the bus 110, the processor 120, the memory 130 or the like) used to execute the operation or function implemented in the other programming modules (e.g., the middleware 132, the API 133 or the application 134). Further, the kernel 131 may provide an interface by which the middleware 132, the API 133 or the application 134 may access the individual components of the electronic device 102 and control or manage the components.

The middleware 132 may play an intermediary role so that the API 133 or the application 134 may communicate with the kernel 131 to exchange data with the kernel 131. Further, with respect to work requests received from the application 134, the middleware 132 may perform control (e.g., scheduling or load balancing) for the work requests, by using a method such as, for example, assigning a priority capable of using the system resources (e.g., the bus 110, the processor 120, the memory 130 or the like) of the electronic device 102, to at least one of the applications 134.

The API 133 may include at least one interface or function (e.g., command) for, for example, file control, window control, image processing or character control, as an interface by which the application 134 controls the function provided in the kernel 131 or the middleware 132.

In various embodiments, the application 134 may include a short message service (SMS)/multimedia message service (MMS) application, an e-mail application, a calendar application, an alarm application, a healthcare application (e.g., an application for measuring the quantity of exercise or the blood glucose) or an environmental information application (e.g., an application for providing pressure, humidity or temperature information). Additionally or alternatively, the application 134 may be an application related to information exchange between the electronic device 102 and an external electronic device (e.g., an electronic device 104). The application related to information exchange may include, for example, a notification relay application for delivering specific information to the external electronic device, or a device management application for managing the external electronic device.

For example, the notification relay application may include a function of delivering the notification information generated in other applications (e.g., the SMS/MMS application, the e-mail application, the healthcare application, the environmental information application or the like) of the electronic device 102, to the external electronic device (e.g., the electronic device 104). Additionally or alternatively, the notification relay application may, for example, receive the notification information from the external electronic device (e.g., the electronic device 104), and provide the received notification information to the user. The device management application may, for example, manage (e.g., install, delete or update) the function (e.g., a function of enabling/disabling all or some of the components of the external electronic device, or adjusting the brightness (or resolution) of the display) for at least a part of the external electronic device (e.g., the electronic device 104) that communicates with the electronic device 102, the application operating in the external electronic device, or the service (e.g., a call service or a messaging service) provided in the external electronic device.

In some embodiments, the application 134 may include an application that is specified according to the properties (e.g., the type of the electronic device) of the external electronic device (e.g., the electronic device 104). For example, if the external electronic device is an MP3 player, the application 134 may include an application related to music playback. Similarly, if the external electronic device is a mobile medical device, the application 134 may include an application related to healthcare. In one embodiment, the application 134 may include at least one of an application specified in the electronic device 102, or an application received from the external electronic device (e.g., a server 106 or the electronic device 104).

The I/O interface 140 may forward the command or data that is received from the user through an I/O device (e.g., a sensor, a keyboard, or a touch screen) to, for example, the processor 120, the memory 130 or the communication interface 160 through the bus 110. For example, the I/O interface 140 may provide the data for a user's touch made on the touch screen, to the processor 120. The I/O interface 140 may, for example, output the command or data that is received from the processor 120, the memory 130 or the communication interface 160 via the bus 110, through an I/O device (e.g., a speaker or a display).

The display 150 may display various information (e.g., multimedia data or text data), for the user.

The communication interface 160 may connect communication between the electronic device 102 and the external device (e.g., the electronic device 104 or the server 106). For example, the communication interface 160 may communicate with the external device by being connected to a network 162 through wireless communication or wired communication. In one embodiment, the communication interface 160 may be connect wireless communication or wired communication between the electronic device 102 and the external device (e.g., the electronic device 104 or the server 106) without the network 162. The wireless communication may include at least one of, for example, wireless fidelity (WiFi), Bluetooth (BT), near field communication (NFC), global positioning system (GPS), or cellular communication (e.g., long term evolution (LTE), long term evolution-advanced (LTE-A), code division multiple access (CDMA), wideband code division multiple access (WCDMA), universal mobile telecommunication system (UMTS), wireless broadband (WiBro), global system for mobile communications (GSM) or the like). The wired communication may include at least one of, for example, universal serial bus (USB), universal asynchronous receiver/ transmitter (UART), mobile high-definition link (MHL), high definition multimedia interface (HDMI), recommended standard 232 (RS-232) or plain old telephone service (POTS).

In one embodiment, the network 162 may be a telecommunications network. The telecommunications network may include at least one of a computer network, the Internet, internet of things (IoT), or a telephone network. In one embodiment, a protocol (e.g., transport layer protocol, data link layer protocol or physical layer protocol) for communication between the electronic device 102 and the external device may be supported in at least one of the application 134, the API 133, the middleware 132, the kernel 131 or the communication interface 160.

Figure 2:
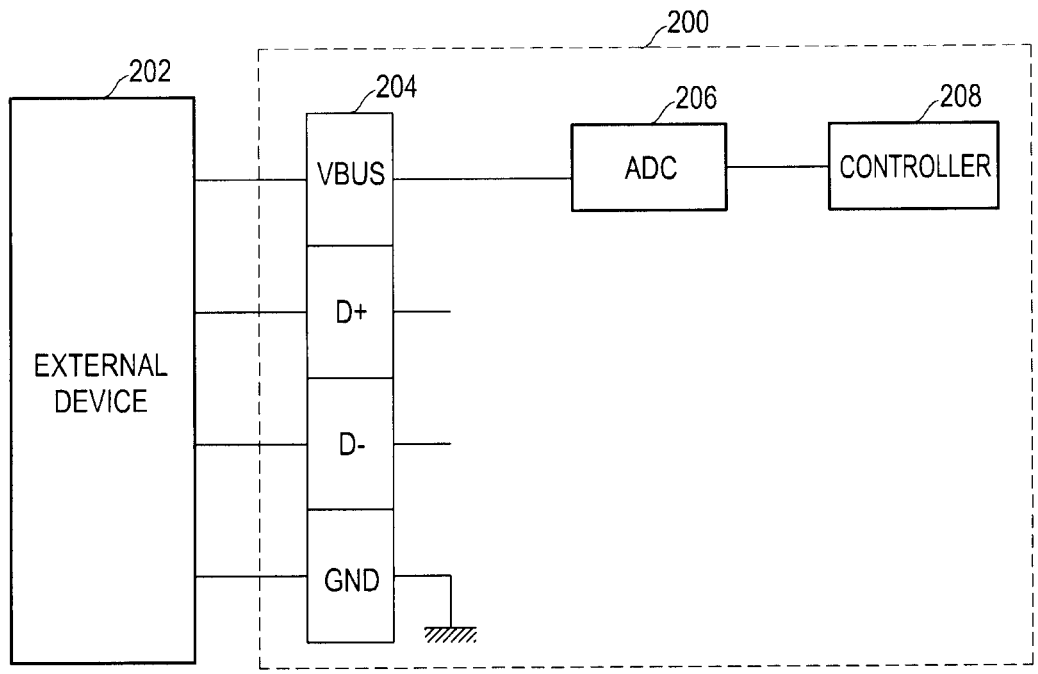
FIG. 2 is a block diagram for identifying an external device in an electronic device according to an embodiment of the present disclosure.

FIG. 2 is a block diagram for identifying an external device in an electronic device according to an embodiment of the present disclosure.

Referring to FIG. 2, an external device 202 may be connected to an electronic device 200. The electronic device 200 and the external device 202 may be the electronic device 102 and the electronic device 104 shown in FIG. 1, respectively. The electronic device 200 may include an interface connector 204, an analog-to-digital converter (ADC) 206, and a controller 208.

The interface connector 204 may include a power supply terminal VBUS, two communication terminals D+ and D−, and a ground terminal GND. The interface connector 204 may be a 4-pin interface connector corresponding to any one of the interfaces such as, for example, USB, UART and MHL. Names of the terminals of the interface connector 204 may vary depending on the type of the interface. Although a 4-pin interface connector is shown as an example of the interface connector 204, any other interface connector, the number of terminals of which, or the type of which is different, may also be used as long as the interface connector includes the power supply terminal VBUS that is used to identify the type of the external device 202 according to various embodiments of the present disclosure.

Power may be input to the power supply terminal VBUS of the interface connector 204 from the external device 202. For example, the power that is input to the power supply terminal VBUS may be used an operating power or charging power for the electronic device 200. The two communication terminals D+ and D− of the interface connector 204 may be used to perform communication between the electronic device 200 and the external device 202. An example in which the communication terminals D+ and D− are connected to other components of the electronic device 200 will be described below. The ground terminal GND may be connected to the ground.

The external device 202 may be connected to the interface connector 204. Although not shown in FIG. 2, the external device 202 may also include an interface connector that is the same in structure as the interface connector 204. The external device 202 may be either a process test tool or a device other than the process test tool. The device other than the process test tool may be any one of, for example, a PC, a charging device and the like. If the external device 202 is a device other than the process test tool, the power defined by the interface standard may be input to the power supply terminal VBUS from the external device 202. If the external device 202 is the process test tool, process test power may be input to the power supply terminal VBUS from the external device 202. A voltage of the process test power may be lower than a voltage of the power defined by the interface standard. For example, the voltage of the power defined by the interface standard may be 5V, and the voltage of the process test power may be 4V.

The ADC 206 may convert a voltage of the power that is input to the power supply terminal VBUS of the interface connector 204, into a digital value, and provide the digital value to the controller 208. The controller 208 may measure a voltage of the power that is input to the power supply terminal VBUS of the interface connector 204, using the digital value received from the ADC 206. The controller 208 may identify a type of the external device 202 based on the measured voltage. The controller 208 may determine whether the external device 202 is a process test tool, based on the measured voltage. The controller 208 may measure the measured power with a threshold. The threshold may be a reference value that can be used to determine whether the external device 202 is a process test tool. For example, if a voltage of the power defined by the interface standard is 5V and a voltage of the process test power is 4V, the threshold may be 4.5V. The controller 208 may identify the external device 202 as a process test tool, if the measured voltage is less than the threshold. The controller 208 may identify the external device 202 as a device other than the process test tool, if the measured voltage is greater than or equal to the threshold.

Therefore, the electronic device 200 may determine whether a type of the external device 202 connected to the electronic device 200 is a process test tool, while connecting the electronic device 200 and the external device 202 with each other using the interface connector 204 that does not include an ID terminal.

If the external device 202 is identified as the process test tool, the controller 208 may notify the identification results to an application processor (AP) (not shown) that can be included in the electronic device 200. The AP will be described below. The AP may start a process test operation by running a process automation program in response to the notification indicating that the external device 202 is identified as the process test tool.

The controller 208 according to an embodiment of the present disclosure may include the processor 120 and the memory 130 for storing the information required by the processor 120, both of which are shown in FIG. 1. The controller 208 may be implemented using an AP that can be included in the electronic device 200. If the controller 208 is implemented using an AP that includes an ADC port, the ADC 206 may be omitted. If the controller 208 is implemented using an AP that includes an ADC port, the controller 208 may measure a voltage of the power that is input to the power supply terminal VBUS, as a digital value through the ADC port.

According to an embodiment of the present disclosure, at least one of the ADC 206 and the controller 208 may be included in an interface integrated circuit (IC) that can be included in the electronic device 200. The interface IC may be an IC that provides at least a portion of the communication interface 160 shown in FIG. 1.

Figure 3:
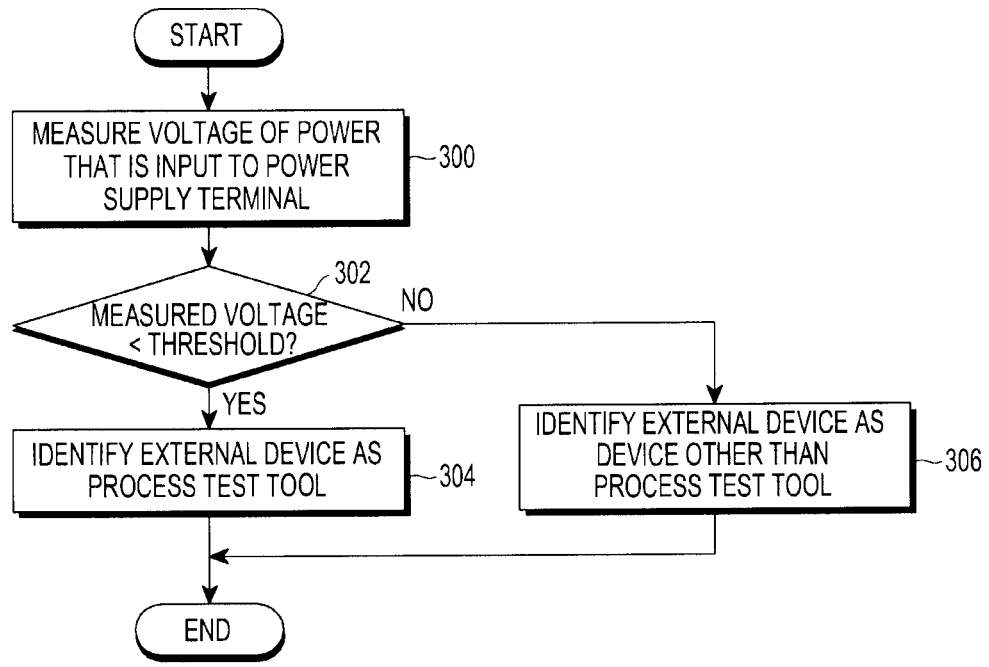
FIG. 3 is a flowchart illustrating an operation of an electronic device according to an embodiment of the present disclosure.

FIG. 3 is a flowchart illustrating an operation of an electronic device according to an embodiment of the present disclosure. Operations illustrated in FIG. 3 may be implemented by, for example, the controller 208 of the electronic device 200.

Referring to FIG. 3, in operation 300, the controller 208 may measure a voltage of the power that is input to the power supply terminal VBUS of the interface connector 204, using a digital value received from the ADC 206. In operation 302, the controller 208 may compare the measured voltage with a threshold. If the measured voltage is less than the threshold, the controller 208 may identify the external device 202 as a process test tool in operation 304. If the measured voltage is greater than or equal to the threshold, the controller 208 may identify the external device 202 as a device other than the process test tool in operation 306.

Figure 4:
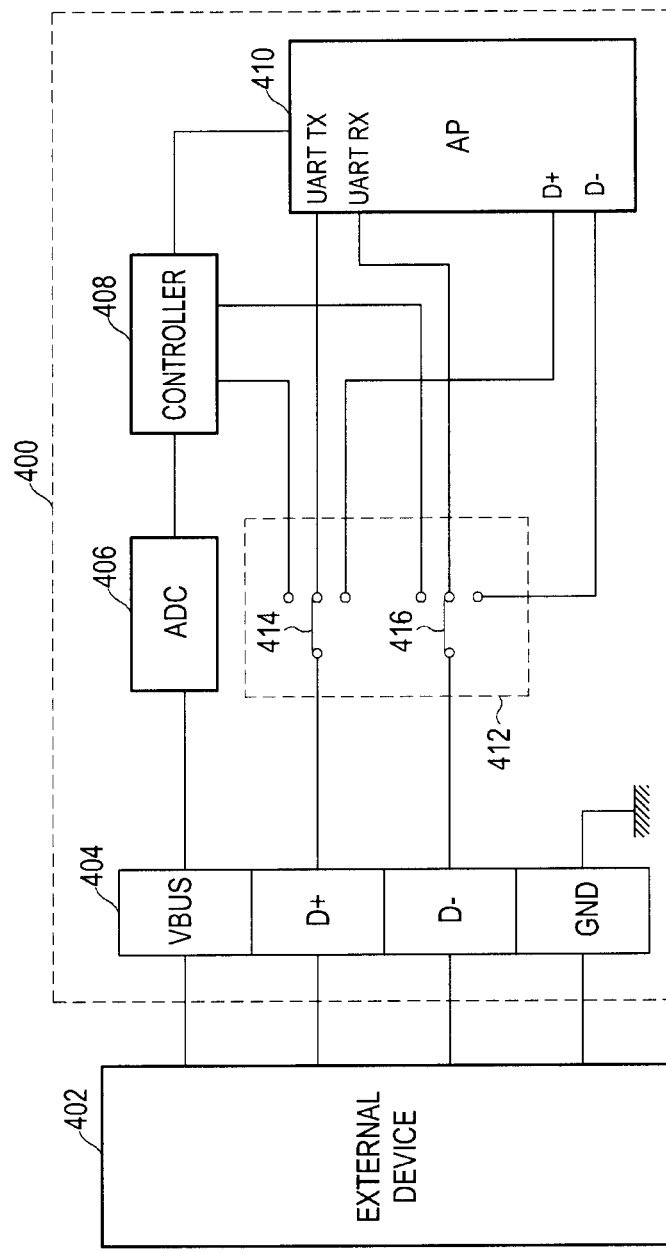
FIG. 4 is a block diagram for identifying an external device in an electronic device according to another embodiment of the present disclosure.

FIG. 4 is a block diagram for identifying an external device in an electronic device according to another embodiment of the present disclosure.

Referring to FIG. 4, an external device 402 may be connected to an electronic device 400. The electronic device 400 and the external device 402 may be the electronic device 102 and the electronic device 104 shown in FIG. 1, respectively. The electronic device 400 may include an interface connector 404, an ADC 406, a controller 408, an AP 410 and a switching unit 412.

In the electronic device 400, the interface connector 404 and the ADC 406 may correspond to the interface connector 204 and the ADC 206 in FIG. 2, respectively. The external device 402 connected to the interface connector 404 may also correspond to the external device 202 in FIG. 2. Therefore, as for the interface connector 404, the ADC 406 and the external device 402, a description overlapping with the description made with reference to FIGS. 1 to 3 may be omitted below.

The controller 408 may measure a voltage of the power that is input to the power supply terminal VBUS of the interface connector 404, using the digital value received from the ADC 406. The controller 408 may identify a type of the external device 402 based on the measured voltage. The controller 408 may determine whether the external device 402 is a process test tool, based on the measured voltage. Like the above-described controller 208 in FIG. 2, the controller 408 may compare the measured voltage with a threshold to identify the external device 402 as one of a process test tool and a device other than the process test tool.

The switching unit 412 may include switches 414 and 416 that are interlocked under control of the controller 408. The switch 414 may selectively connect the communication terminal D+ of the interface connector 404 to one of the controller 408, a UART communication terminal UART TX and a USB communication terminal D+ of the AP 410. The switch 416 may selectively connect the communication terminal D− of the interface connector 404 to one of the controller 408, a UART communication terminal UART RX and a USB communication terminal D− of the AP 410.

If the external device 402 is not a process test tool, the external device 402 may be either a device capable of communication through the interface connector 404 or a device incapable of communication through the interface connector 404. An example of the external device capable of communication through the interface connector 404 may include a PC. An example of the external device incapable of communication through the interface connector 404 may include a charging device. As for the external device incapable of communication through the interface connector 404, its communication terminals D+ and D− may be short-circuited with each other.

The controller 408 may determine whether the communication terminals D+ and D− of the interface connector 404 are short-circuited with each other, if the external device 402 is a device other than the process test tool.

Figure 5:
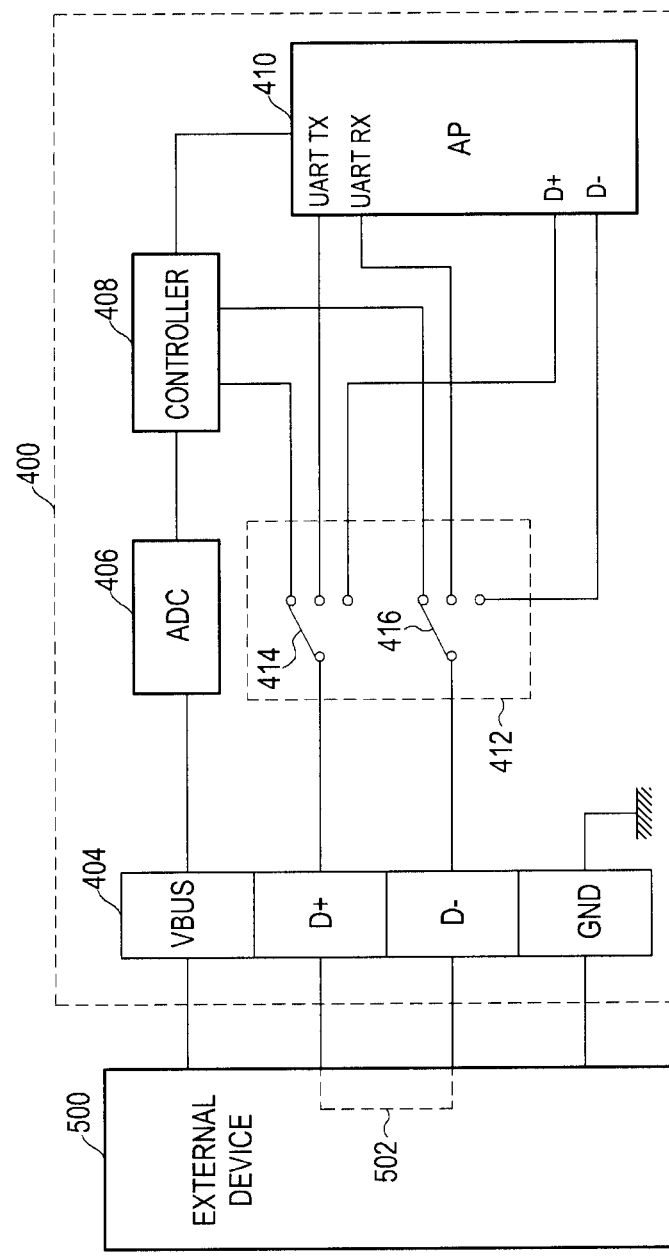
FIG. 5 is a block diagram illustrating an operation of identifying an external device in an electronic device according to another embodiment of the present disclosure.

FIG. 5 is a block diagram illustrating an operation of identifying an external device in an electronic device according to another embodiment of the present disclosure.

Referring to FIG. 5, an electronic device 400 may be the same as the electronic device 400 in FIG. 4. An external device 500 connected to the interface connector 404 of the electronic device 400 is given as an example of the external device 402, in which the communication terminals D+ and D− are short-circuited with each other as shown by reference numeral 502. Therefore, although the external device 500 and the external device 402 are assigned different reference numerals, the external device 500 may correspond to the external device 402.

The controller 408 may control the switching unit 412 so that the communication terminals D+ and D− of the interface connector 404 may be connected to the controller 408 through the switches 414 and 416 as shown in FIG. 5. The controller 408 may determine whether the communication terminals D+ and D− of the interface connector 404, which are connected through the switching unit 412, are short-circuited with each other. For example, the controller 408 may determine whether the communication terminals D+ and D− of the interface connector 404 are short-circuited with each other, by transmitting a specific signal to one of the communication terminals D+ and D− of the interface connector 404 and determining whether the transmitted specific signal is returned through another communication terminal. The controller 408 may determine that the communication terminals D+ and D− of the interface connector 404 are short-circuited with each other, if the specific signal transmitted to one of the communication terminals D+ and D− of the interface connector 404 is returned through another communication terminal. On the other hand, the controller 408 may determine that the communication terminals D+ and D− of the interface connector 404 are not short-circuited with each other, if the specific signal transmitted to one of the communication terminals D+ and D− of the interface connector 404 is not returned through another communication terminal.

The controller 408 may identify the external device 402 as a device capable of communication through the interface connector 404, if the communication terminals D+ and D− of the interface connector 404 are not short-circuited with each other. On the other hand, the controller 408 may identify the external device 402 as a charging device, if the communication terminals D+ and D− of the interface connector 404 are short-circuited with each other like the above-described external device 500 in FIG. 5 as shown by reference numeral 502.

The controller 408 may transmit a result of identifying the type of the external device 402 to the AP 410. Communication between the controller 408 and the AP 410 may be made through an inter-integrated circuit (I2C) bus.

If the external device 402 is identified as a process test tool, the controller 408 may control the switching unit 412 so that the communication terminals D+ and D− of the interface connector 404 may be connected to the UART communication terminals UART TX and UART RX of the AP 410, respectively, as shown in FIG. 4. The AP 410 may start a process test operation by running a process automation program, if the AP 410 recognizes through the controller 408 that the external device 402 is identified as the process test tool. Therefore, the process test by the process test tool may be made.

If the external device 402 is identified as a device capable of communication through the interface connector 404, the controller 408 may control the switching unit 412 so that the communication terminals D+ and D− of the interface connector 404 may be connected to the USB communication terminals D+ and D− of the AP 410, respectively. Therefore, the external device 402 and the AP 410 may communicate with each other through the communication terminals D+ and D− of the interface connector 404.

If the external device 402 is identified as a charging device, the controller 408 may start a charging operation of charging a battery of the electronic device 400 by the power that is input to the power supply terminal VBUS of the interface connector 404. Since the technology related to the charging of the electronic device is the conventional technology, a detailed description thereof will be omitted.

Like the above-described controller 208 in FIG. 2, the controller 408 according to various embodiments of the present disclosure may be implemented in a variety of ways described above. According to an embodiment of the present disclosure, at least one of the ADC 406, the controller 408 and the switching unit 412 may be implemented by an interface IC that can be included in the electronic device 400, like the ADC 206 and the controller 208 in FIG. 2.

Figure 6:
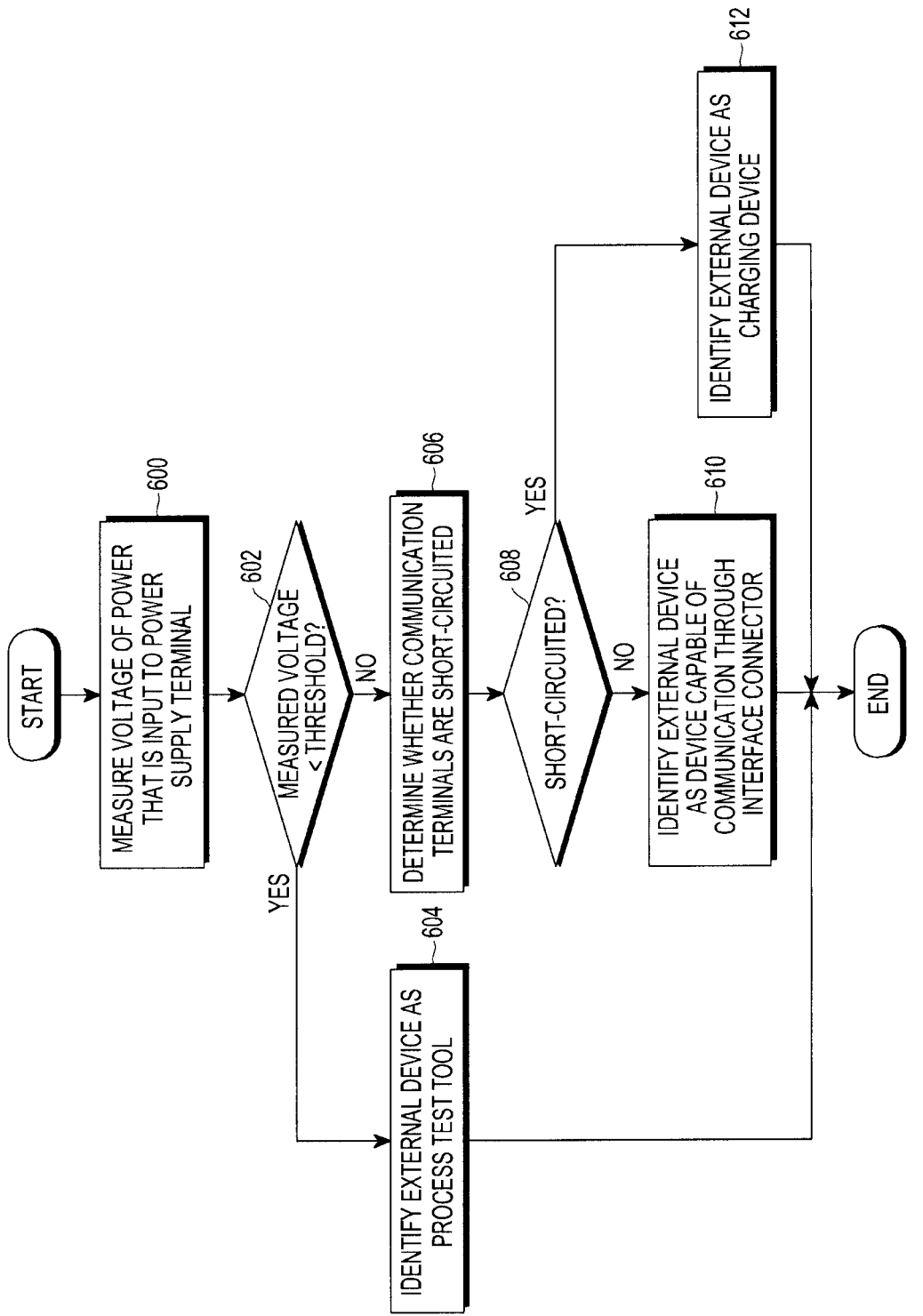
FIG. 6 is a flowchart illustrating an operation of an electronic device according to another embodiment of the present disclosure.

FIG. 6 is a flowchart illustrating an operation of an electronic device according to another embodiment of the present disclosure. Operations illustrated in FIG. 6 may be implemented by, for example, the controller 408 of the electronic device 400.

Referring to FIG. 6, in operation 600, the controller 408 may measure a voltage of the power that is input to the power supply terminal VBUS of the interface connector 404, using a digital value received from the ADC 406. In operation 602, the controller 408 may compare the measured voltage with a threshold. If the measured voltage is less than the threshold, the controller 408 may identify the external device 402 as a process test tool in operation 604. If the measured voltage is greater than or equal to the threshold, the controller 408 may identify the external device 402 as a device other than the process test tool, and determine whether the communication terminals D+ and D− of the interface connector 404 are short-circuited with each other, in operation 606.

The controller 408 may determine a result of determining whether the communication terminals D+ and D− of the interface connector 404 are short-circuited with each other in operation 608. The controller 408 may perform operation 610 or operation 612 depending on whether the communication terminals D+ and D− of the interface connector 404 are short-circuited with each other. If the communication terminals D+ and D− of the interface connector 404 are not short-circuited with each other, the controller 408 may identify the external device 402 as a device capable of communication through the interface connector 404 in operation 610. On the other hand, if the communication terminals D+ and D− of the interface connector 404 are short-circuited with each other like the above-described external device 500 in FIG. 5 as shown by reference numeral 502, the controller 408 may identify the external device 402 as a charging device in operation 612.

Figure 7:
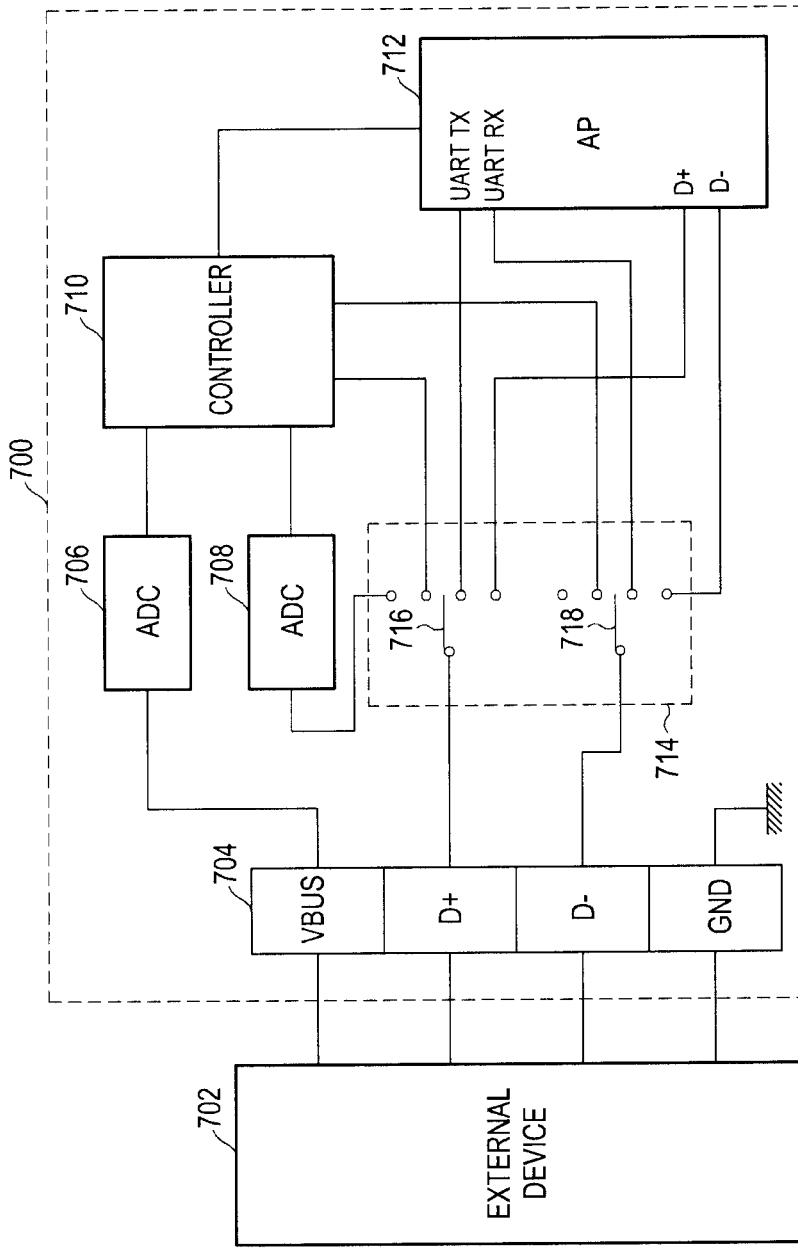
FIG. 7 is a block diagram for identifying an external device in an electronic device according to further another embodiment of the present disclosure.

FIG. 7 is a block diagram for identifying an external device in an electronic device according to further another embodiment of the present disclosure.

Referring to FIG. 7, an external device 702 may be connected to an electronic device 700. The electronic device 700 and the external device 702 may be the electronic device 102 and the electronic device 104 shown in FIG. 1, respectively. The electronic device 700 may include an interface connector 704, ADCs 706 and 708, a controller 710, an AP 712 and a switching unit 714.

In the electronic device 700, the interface connector 704, the ADC 706 and the AP 712 may correspond to the interface connector 404, the ADC 406 and the AP 410 in FIG. 4, respectively. The external device 702 connected to the interface connector 704 may also correspond to the external device 402 in FIG. 4. Therefore, as for the interface connector 704, the ADC 706 and the external device 702, a description overlapping with the description made with reference to FIGS. 1 to 6 may be omitted below.

The controller 710 may measure a voltage of the power that is input to the power supply terminal VBUS of the interface connector 704, using the digital value received from the ADC 706. The controller 710 may identify a type of the external device 702 based on the measured voltage. The controller 710 may determine whether the external device 702 is a process test tool, based on the measured voltage. Like the above-described controller 208 in FIG. 2, the controller 710 may compare the measured voltage with a threshold to identify the external device 702 as one of a process test tool and a device other than the process test tool.

The switching unit 714 may include switches 716 and 718 that are interlocked under control of the controller 710. The switch 716 may selectively connect the communication terminal D+ of the interface connector 704 to one of the ADC 708, the controller 710, a UART communication terminal UART TX and a USB communication terminal D+ of the AP 712. The switch 718 may selectively connect the communication terminal D− of the interface connector 704 to one of the controller 710, a UART communication terminal UART RX and a USB communication terminal D− of the AP 712. According to an embodiment of the present disclosure, rather than the switch 716 selectively connects the communication terminal D+ of the interface connector 704 to the ADC 708, the switch 718 may selectively connect the communication terminal D+ of the interface connector 704 to the ADC 708.

If the external device 702 is not a process test tool, the external device 702, like the above-described external device 402, may be either a device capable of communication through the interface connector 704 or a device incapable of communication through the interface connector 704.

If the external device 702 is identified as a device other than the process test tool, the controller 710, like the above-described controller 408, may control the switching unit 714 so that the communication terminals D+ and D− of the interface connector 704 may be connected to the controller 710, and may determine whether the communication terminals D+ and D− of the interface connector 704 are short-circuited with each other. The controller 710, like the above-described controller 408, may identify the external device 702 as a device capable of communication through the interface connector 704, if the communication D+ and D− of the interface connector 704 are not short-circuited with each other. The controller 710 may identify the external device 702 as a device incapable of communication through the interface connector 704, if the communication D+ and D− of the interface connector 704 are short-circuited with each other like the above-described external device 500 in FIG. 5 as shown by reference numeral 502.

The device incapable of communication through the interface connector 704 may include, for example, a charging device, as described above. For example, the charging device may include various types such as a charging-only device, a charging-compatible speaker, and a car charging device. The charging-compatible speaker may supply the charging power to the electronic device 700 through the power supply terminal VBUS of the interface connector 704, and may receive an audio signal from the electronic device 700. An audio signal may be transmitted between the charging-compatible speaker and the electronic device 700 by, for example, Bluetooth communication.

Therefore, if the external device 702 is a device incapable of communication through the interface connector 704, the electronic device 700 should be able to determine whether the external device 702 is any of a charging-only device, a charging-compatible speaker, or a car charging device. In addition to the charging-only device, the charging-compatible speaker and the car charging device, there may be various other external devices incapable of communication through the interface connector 704, which can be connected to the electronic device 700. Therefore, the electronic device 700 should be able to identify the type of the external device 702 in more detail, if the external device 702 is a device incapable of communication through the interface connector 704.

In the external device 702 incapable of communication through the interface connector 704, if a resistor with a specific resistance is connected to communication terminals D+ and D−, the electronic device 700 may identify the type of the external device 702 based on the resistance of the resistor connected to the communication terminals D+ and D− of the external device 702. The resistance of the resistor connected to the communication terminals D+ and D− of the external device 702 may be different depending on the type of the external device.

If the communication terminals D+ and D− of the interface connector 704 are short-circuited with each other, the controller 710 may measure a resistance at the communication terminals D+ and D− of the interface connector 704. According to an embodiment of the present disclosure, the controller 710 may measure a voltage corresponding to a resistance of the resistor connected to the communication terminals D+ and D−, instead of directly measuring the resistance at the communication terminals D+ and D− of the interface connector 704.

Figure 8:
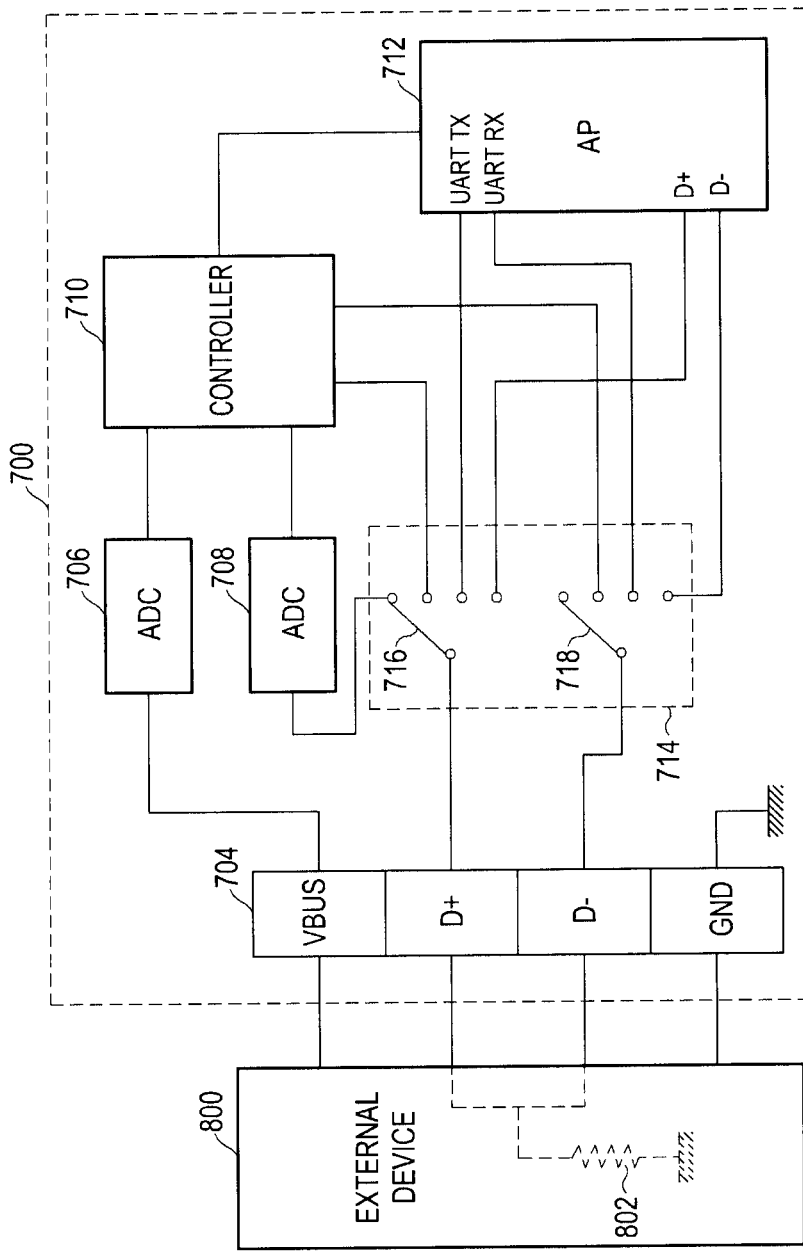
FIG. 8 is a block diagram illustrating an operation of identifying an external device in an electronic device according to further another embodiment of the present disclosure.

FIG. 8 is a block diagram illustrating an operation of identifying an external device in an electronic device according to further another embodiment of the present disclosure.

Referring to FIG. 8, an electronic device 700 may be the same as the electronic device 700 in FIG. 7. An external device 800 connected to the interface connector 704 of the electronic device 700 is given as an example of the external device 702, in which a resistor 802 is connected to the short-circuited communication terminals D+ and D−. Therefore, although the external device 800 and the external device 702 are assigned different reference numerals, the external device 800 may correspond to the external device 702. Although a pull-down resistor is connected as an example of the resistor 802 in FIG. 8, a pull-up resistor may also be connected unlike in FIG. 8 according to an embodiment of the present disclosure.

The controller 710 may control the switching unit 714 so that one of the communication terminals D+ and D− of the interface connector 704 may be connected to the ADC 708 through the switch 716 or the switch 718. In the example of FIG. 8, the communication terminal D+ of the interface connector 704 may be connected to the ADC 708 through the switch 716.

Although not shown in FIG. 8, pull-up power may be applied to an input terminal of the ADC 708. Therefore, a voltage corresponding to a resistance of the resistor 802 of the external device 800 may be input to the ADC 708. The ADC 708 may convert the voltage corresponding to the resistance of the resistor 802 into a digital value, and provide the digital value to the controller 710.

The controller 710 may measure a voltage corresponding to the resistance of the resistor 802 of the external device 800, using the digital value received from the ADC 708. The controller 710 may identify the type of the external device 800 based on the measured voltage. For example, the controller 710 may identify the external device 800 as one of the charging-only device, the charging-compatible speaker and the car charging device.

The controller 710, like the above-described controller 408, may transmit a result of identifying the type of the external device 800 to the AP 712.

Since operations of the controller 710, the AP 712 and the switching unit 714 according to the type of the external device 800 may be easily understood by those skilled in the art referring to the foregoing description made with reference to FIG. 4, a detailed description thereof will be omitted.

Like the above-described controller 208 in FIG. 2, the controller 710 according to various embodiments of the present disclosure may also be implemented in a variety of ways described above. According to an embodiment of the present disclosure, at least one of the ADCs 706 and 708, the controller 710 and the switching unit 714 may be implemented by an interface IC that can be included in the electronic device 700, like the ADC 206 and the controller 208 in FIG. 2.

An electronic device according to various embodiments of the present disclosure may include an interface connector that includes a power supply terminal and is configured to connect with an external device; and a controller configured to measure a voltage of power that is input to the power supply terminal, and identify a type of the external device connected to the interface connector based on the voltage of the input power.

The controller may determine whether the external device is a process test tool, based on the voltage of the input power.

The controller may identify the external device as the process test tool if the voltage of the input power is less than a threshold, and identify the external device as a device other than the process test tool if the voltage of the input power is greater than or equal to the threshold.

The electronic device may further include a switching unit configured to selectively connect communication terminals of the interface connector to the controller under control of the controller, and the controller may determine whether the communication terminals of the interface connector are short-circuited with each other if the external device is not identified as the process test tool, identify the external device as a device capable of communication through the interface connector if the communication terminals are not short-circuited with each other, and identify the external device as a charging device if the communication terminals are short-circuited with each other.

The electronic device may further include an ADC that converts the voltage of the input power into a digital value and provides the digital value to the controller.

The electronic device may further include a switching unit configured to selectively connect communication terminals of the interface connector to the controller under control of the controller, and the controller may determine whether the communication terminals of the interface connector are short-circuited with each other if the external device is not identified as the process test tool, identify the external device as a device capable of communication through the interface connector if the communication terminals are not short-circuited with each other, and identify the type of the external device based on a voltage corresponding to a resistance of a resistor connected to the communication terminals in the external device if the communication terminals are short-circuited with each other.

The resistance of the resistor may be different depending on the type of the external device.

The electronic device may further include a first ADC configured to convert the voltage of the input power into a digital value and provide the digital value to the controller; and a second ADC configured to convert the voltage corresponding to the resistance into a digital value, and provide the digital value to the controller.

The controller may be an AP of the electronic device.

The interface connector may be a 4-pin interface connector that includes the power supply terminal, two communication terminals, and a ground terminal.

Figure 9:
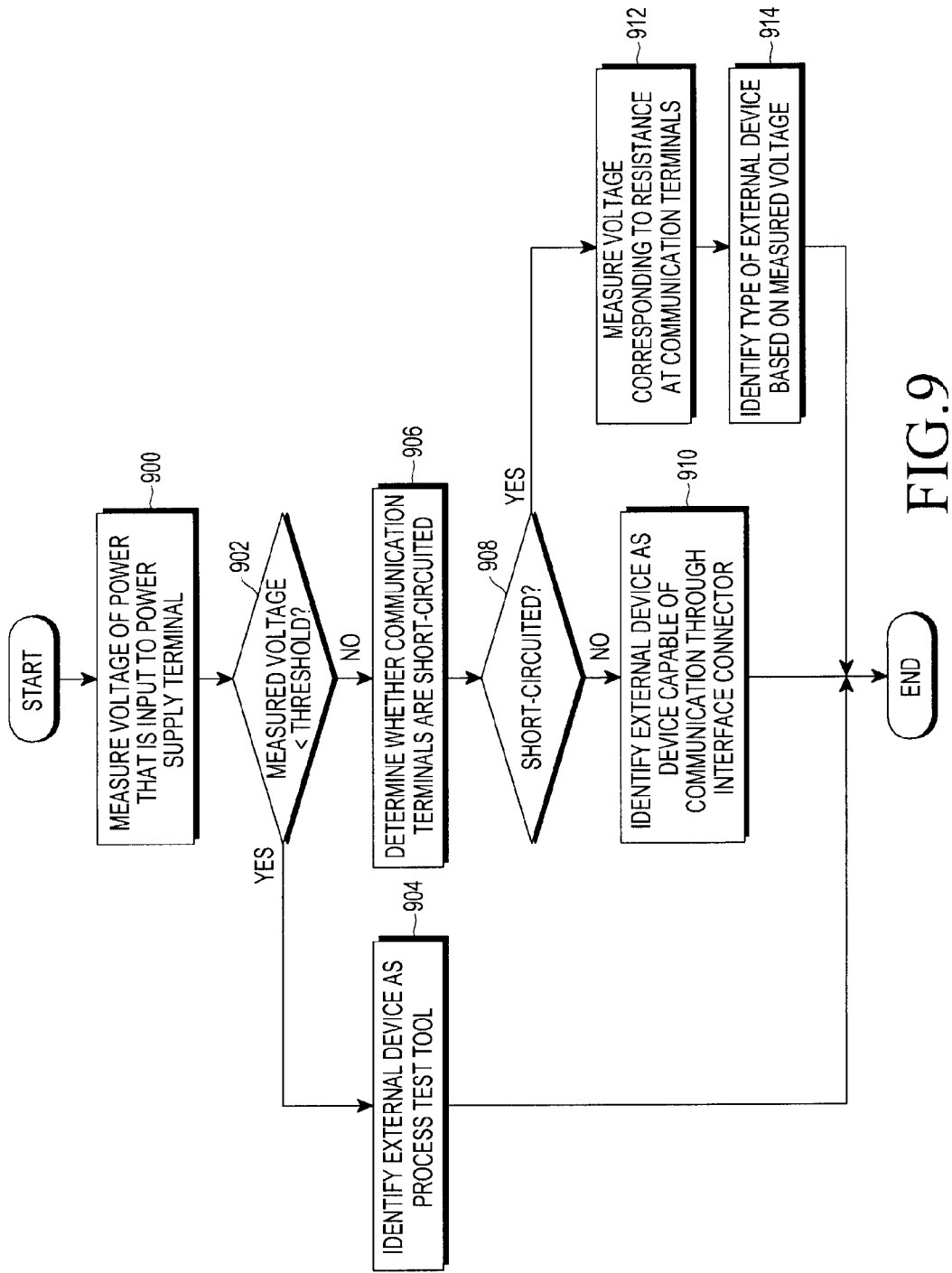
FIG. 9 is a flowchart illustrating an operation of an electronic device according to further another embodiment of the present disclosure.

FIG. 9 is a flowchart illustrating an operation of an electronic device according to further another embodiment of the present disclosure. Operations illustrated in FIG. 9 may be implemented by, for example, the controller 710 of the electronic device 700.

Referring to FIG. 9, in operation 900, the controller 710 may measure a voltage of the power that is input to the power supply terminal VBUS of the interface connector 704, using a digital value received from the ADC 706. In operation 902, the controller 710 may compare the measured voltage with a threshold. If the measured voltage is less than the threshold, the controller 708 may identify the external device 702 as a process test tool in operation 904. If the measured voltage is greater than or equal to the threshold, the controller 710 may identify the external device 702 as a device other than the process test tool, and determine whether the communication terminals D+ and D− of the interface connector 704 are short-circuited with each other, in operation 906.

The controller 710 may determine a result of determining whether the communication terminals D+ and D− of the interface connector 704 are short-circuited with each other in operation 908. The controller 710 may perform operation 910 or operation 912 depending on whether the communication terminals D+ and D− of the interface connector 704 are short-circuited with each other. If the communication terminals D+ and D− of the interface connector 704 are not short-circuited with each other, the controller 710 may identify the external device 702 as a device capable of communication through the interface connector 704 in operation 910. On the other hand, if the communication terminals D+ and D− of the interface connector 704 are short-circuited with each other like the above-described external device 500 in FIG. 5 as shown by reference numeral 502, the controller 710 may, in operation 912, identify the external device 702 as a device incapable of communication through the interface connector 704, connect one of the communication terminals D+ and D− of the interface connector 704 to the ADC 708 as shown in FIG. 8, and measure a voltage corresponding to a resistance at the communication terminals D+ and D− of the interface connector 704, using the digital value received from the ADC 708. In operation 914, the controller 710 may identify the type of the external device 702 based on the measured voltage.

A method for identifying an external device in an electronic device according to various embodiments of the present disclosure may include measuring a voltage of power that is input to a power supply terminal of an interface connector that includes the power supply terminal and is configured to connect with an external device; and identifying a type of the external device connected to the interface connector based on the voltage of the input power.

Identifying the type of the external device may include determining whether the external device is a process test tool, based on the voltage of the input power.

Determining whether the external device is the process test tool may include comparing the voltage of the input power with a threshold; identifying the external device as the process test tool, if the voltage of the input power is less than the threshold; and identifying the external device as a device other than the process test tool, if the voltage of the input power is greater than or equal to the threshold.

Identifying the type of the external device may further include determining whether communication terminals of the interface connector are short-circuited with each other, if the external device is not identified as the process test tool; identifying the external device as a device capable of communication through the interface connector, if the communication terminals are not short-circuited with each other; and identifying the external device as a charging device, if the communication terminals are short-circuited with each other.

Identifying the type of the external device may further include determining whether communication terminals of the interface connector are short-circuited with each other, if the external device is not identified as the process test tool; identifying the external device as a device capable of communication through the interface connector, if the communication terminals are not short-circuited with each other; measuring a voltage corresponding to a resistance of a resistor connected to the communication terminals in the external device, if the communication terminals are short-circuited with each other; and identifying the type of the external device based on the voltage corresponding to the resistance.

The resistance of the resistor may be different depending on the type of the external device.

The interface connector may be a 4-pin interface connector that includes the power supply terminal, two communication terminals, and a ground terminal.

Figure 10:
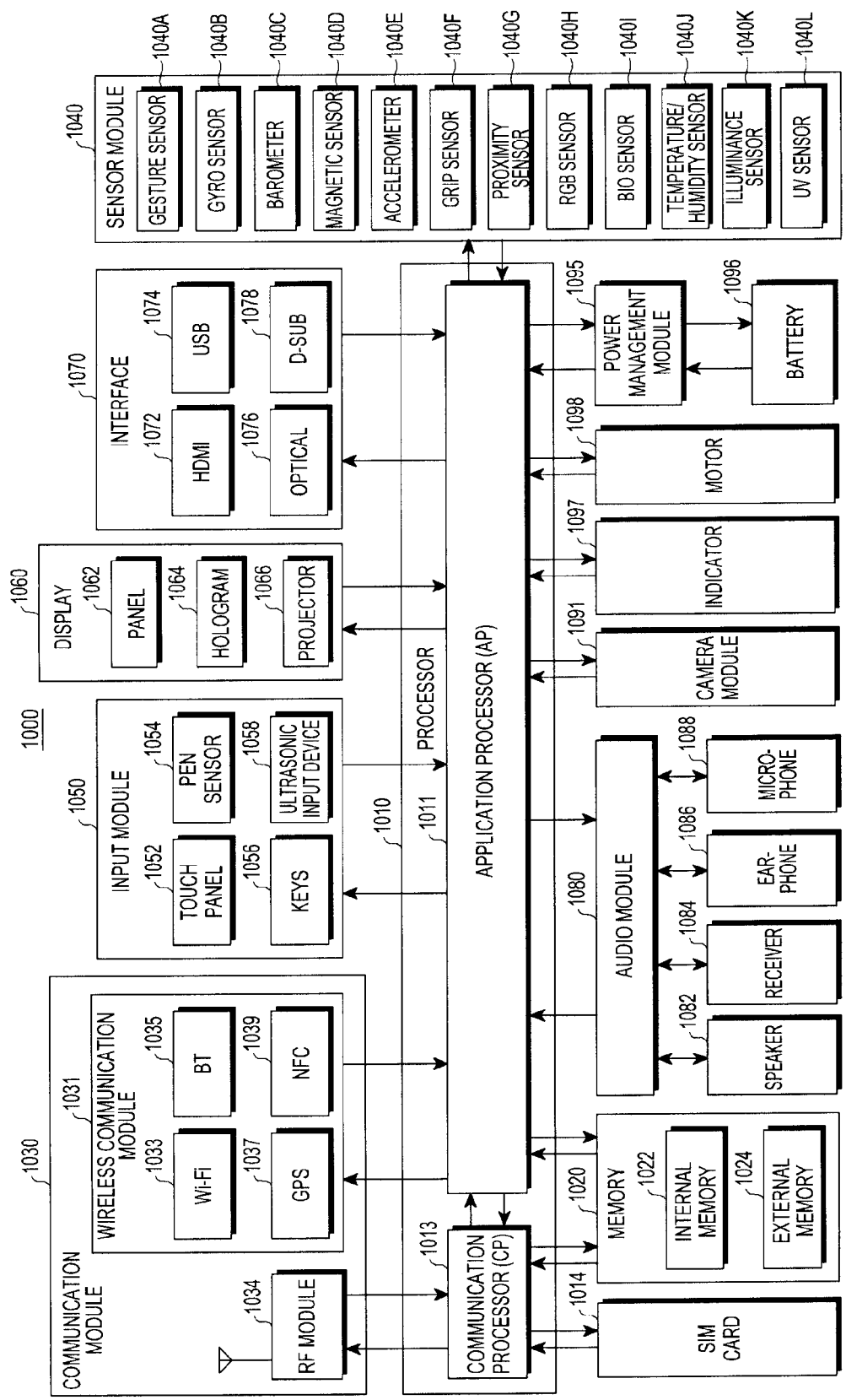
FIG. 10 is a block diagram illustrating a detailed structure of an electronic device according to various embodiments of the present disclosure.

FIG. 10 is a block diagram illustrating a detailed structure of an electronic device according to various embodiments of the present disclosure. An electronic device 1000 shown in FIG. 10 may constitute the whole or a part of, for example, the electronic device 102 shown in FIG. 1.

Referring to FIG. 10, the electronic device 1000 may include one or more processors 1010, a subscriber identification module (SIM) card 1014, a memory 1020, a communication module 1030, a sensor module 1040, an input module 1050, a display 1060, an interface 1070, an audio module 1080, a camera module 1091, a power management module 1095, a battery 1096, an indicator 1097, or a motor 1098.

The processor 1010 may include one or more APs 1011 or one or more communication processor (CP) 1013. The processor 1010 may be, for example, the processor 120 shown in FIG. 1. Although the AP 1011 and the CP 1013 are shown to be included in the processor 1010 in FIG. 10, the AP 1011 and the CP 1013 may be included in different IC packages, respectively. In another embodiment, the AP 1011 and the CP 1013 may be incorporated into one IC package.

The AP 1011 may control a plurality of hardware or software components connected to the AP 1011 by running the operating system or application program, and may process and operate various data including multimedia data. The AP 1011 may be implemented as, for example, a system on chip (SoC). In one embodiment, the processor 1010 may further include a graphic processing unit (GPU) (not shown).

The CP 1013 may perform a function of managing a data link and translating the communication protocol in communication between the electronic device 1000 and other electronic devices connected thereto over the network. The CP 1013 may be implemented as, for example, an SoC. In one embodiment, the CP 1013 may perform at least a portion of the multimedia control function. The CP 1013 may, for example, perform identification or authentication of the electronic device 1000 in the communication network using a subscriber identification module (e.g., the SIM card 1014). Further, the CP 1013 may provide the user with services such as a voice call service, a video call service, a messaging service or a packet data service.

Further, the CP 1013 may control data transmission/reception of the communication module 1030. Although the components such as the CP 1013, the power management module 1095 or the memory 1020 are shown as separate components from the AP 1011 in FIG. 10, the AP 1011, in one embodiment, may be implemented to include at least some (e.g., the CP 1013) of the above-described components.

In one embodiment, the AP 1011 or the CP 1013 may load, on a volatile memory, the command or data received from at least one of a non-volatile memory or other components connected thereto, and process the loaded command or data. Further, the AP 1011 or the CP 1013 may store, in a non-volatile memory, the data that is received from or generated by at least one of other components.

The SIM card 1014 may be a card in which a subscriber identification module is implemented, and may be inserted into a slot that is formed in a specific position of the electronic device 1000. The SIM card 1014 may include unique identification information (e.g., integrated circuit card identifier (ICCID)) or subscriber information (e.g. international mobile subscriber identity (IMSI)).

The memory 1020 may include an internal memory 1022 and an external memory 1024. The memory 1020 may be, for example, the memory 130 shown in FIG. 1. The internal memory 1022 may include at least one of, for example, a volatile memory (e.g., a dynamic RAM (DRAM), a static RAM (SRAM), a synchronous dynamic RAM (SDRAM) and the like) or a non-volatile memory (e.g., a one time programmable ROM (OTPROM), a programmable ROM (PROM), an erasable and programmable ROM (EPROM), an electrically erasable and programmable ROM (EEPROM), a mask ROM, a flash ROM, a NAND flash memory, a NOR flash memory and the like). In one embodiment, the internal memory 1022 may be a solid state drive (SSD). The external memory 1024 may further include a flash drive (e.g., compact flash (CF), secure digital (SD), micro secure digital (Micro-SD), mini secure digital (Mini-SD), extreme digital (Mini-SD), memory stick or the like). The external memory 1024 may be functionally connected to the electronic device 1000 through various interfaces.

Although not shown, the electronic device 1000 may further include a storage device (or storage medium) such as a hard disk drive.

The communication module 1030 may include a wireless communication module 1031 or a radio frequency (RF) module 1034. The communication module 1030 may be included in, for example, the communication interface 160 shown in FIG. 1. The wireless communication module 1031 may include, for example, WiFi 1033, BT 1035, GPS 1037 or NFC 1039. For example, the wireless communication module 1031 may provide a wireless communication function using a radio frequency. Additionally or alternatively, the wireless communication module 1031 may include a network interface (e.g., a LAN card) or a modem for connecting the electronic device 1000 to the network (e.g., Internet, local area network (LAN), wide area network (WAN), communication network, cellular network, satellite network, plain old telephone service (POTS) or the like).

The RF module 1034 may handle transmission/reception of voice or data signals. Although not shown, the RF module 1304 may include, for example, a transceiver, a power AMP module (PAM), a frequency filter, a low noise amplifier (LNA) or the like. Further, the RF module 1034 may further include the part (e.g., conductor or conducting wire) for transmitting and receiving radio waves in the free space in wireless communication.

The sensor module 1040 may include at least one of, for example, a gesture sensor 1040A, a gyro sensor 1040B, a barometer 1040C, a magnetic sensor 1040D, an accelerometer 1040E, a grip sensor 1040F, a proximity sensor 1040G, a red, green, blue (RGB) sensor 1040H, a biosensor 1040I, a temperature/humidity sensor 1040J, an illuminance sensor 1040K, a ultra violet (UV) sensor 1040L or an infra red (IR) sensor (not shown). The sensor module 1040 may measure the physical quantity or sense the operating status of the electronic device, and convert the measured or sensed information into an electrical signal. Additionally or alternatively, the sensor module 1040 may include, for example, an E-nose sensor (not shown), an electromyography EMG sensor (not shown), an electroencephalogram EEG sensor (not shown), an electrocardiogram (ECG) sensor (not shown), a fingerprint sensor or the like. The sensor module 1040 may further include a control circuit for controlling at least one sensor belonging thereto.

The input module 1050 may include a touch panel 1052, a (digital) pen sensor 1054, a key 1056 or an ultrasonic input device 1058. The input module 1050 may be included in, for example, the I/O interface 140 shown in FIG. 1. The touch panel 1052 may recognize a touch input in at least one of, for example, a capacitive manner, a resistive manner, an infrared manner or an ultrasonic manner. Further, the touch panel 1052 may further include a controller (not shown). In the case of the capacitive touch panel, the touch panel 1052 may recognize not only the physical contact but also the proximity. The touch panel 1052 may further include a tactile layer function. In this case, the touch panel 1052 may provide a tactile feedback to the user.

The (digital) pen sensor 1054 may be implemented by using, for example, a method same as or similar to receiving a user's touch input or a separate recognition sheet. The key 1056 may include, for example, a physical button. Further, the key 1056 may include, for example, an optical key, a keypad, or a touch key. The ultrasonic input device 1058 is a device that can check data by detecting sound waves with a microphone (e.g., a microphone (MIC) 1088) in the electronic device 1000, through an input tool that generates an ultrasonic signal, and thereby the ultrasonic input device 1058 may enable wireless recognition. In one embodiment, the electronic device 1000 may receive a user input from an external device (e.g., a network, a computer or a server) connected thereto, using the communication module 1030.

The display 1060 may include a panel 1062, a hologram 1064 or a projector 1066. The display 1060 may be, for example, the display 150 shown in FIG. 1. The panel 1062 may be, for example, a liquid-crystal display (LCD) panel, an active-matrix organic light-emitting diode (AM-OLED) panel or the like. The panel 1062 may be implemented to be, for example, flexible, transparent or wearable. The panel 1062, together with the touch panel 1052, may be configured as one module. The hologram 1064 may show stereoscopic images into the air using the interference of the light. The projector 1066 may display images on the external screen by projecting the light. In one embodiment, the display 1060 may further include a control circuit for controlling the panel 1062, the hologram 1064 or the projector 1066.

The interface 1070 may include, for example, HDMI 1072, USB 1074, optical communication 1076 or D-sub-miniature (D-sub) 1078. The interface 1070 may be included in, for example, the communication interface 160 shown in FIG. 1. Additionally or alternatively, the interface 1070 may include, for example, MHL, secure Digital/multi-media (SD/MMC) card (not shown) or infrared data association (IrDA) (not shown).

The audio module 1080 may convert the sound and electrical signal bi-directionally. The audio module 1080 may be included in, for example, the I/O interface 140 shown in FIG. 1. The audio module 1080 may process the sound information that is input or output through, for example, a speaker 1082, a receiver 1084, an earphone 1086, the microphone 1088 or the like.

The camera module 1091, a device capable of shooting images or videos, may include one or more image sensors (e.g., a front sensor or a rear sensor), a lens, an image signal processor (ISP) (not shown), or a flash (e.g., LED or xenon lamp) (not shown) according to an embodiment of the present disclosure.

The power management module 1095 may manage the power of the electronic device 1000. Although not shown, the power management module 1095 may include, for example, a power management integrated circuit (PMIC), a charger integrated circuit (IC) or a battery fuel gauge.

The PMIC may be mounted in, for example, an IC or a SoC chip. A charging scheme may be classified into a wired charging scheme and a wireless charging scheme. The charger IC may charge a battery, and may prevent the inflow of overvoltage or overcurrent from the charger. In one embodiment, the charger IC may include a charger IC for at least one of the wired charging scheme and the wireless charging scheme. The wireless charging scheme may include, for example, a magnetic resonance scheme, a magnetic induction scheme, or an electromagnetic scheme, and may additionally include an additional circuit for wireless charging (e.g., a coil loop, a resonance circuit, a rectifier).

The battery fuel gauge may measure, for example, the residual capacity, the charging voltage, the charging current or the temperature of the battery 1096. The battery 1096 may supply the power by storing electricity. The battery 1096 may include, for example, a rechargeable battery or a solar battery.

The indicator 1097 may indicate specific states (e.g., a boot state, a message status, or a charging status) of the electronic device 1000 or a part (e.g., the AP 1011) of the electronic device 1000. The motor 1098 may convert an electrical signal into mechanical vibrations.

Although not shown, the electronic device 1000 may include a processing device (e.g., GPU) for supporting Mobile TV. The processing device for supporting Mobile TV may process the media data that is based on the standards such as, for example, digital multimedia broadcasting (DMB), digital video broadcasting (DVB), or MediaFLO.

Each of the above-described components of the electronic device according to various embodiments of the present disclosure may include one or more parts, and the names of the components may vary depending on the type of the electronic device. The electronic device according to various embodiments of the present disclosure may include at least one of the above components, some of which may be omitted, or may further include other additional components. Some of the components of the electronic device according to various embodiments of the present disclosure may be configured as one entity by being combined, so the entity may perform the previous functions of the components in the same way.

As used herein, the term 'module' may refer to a unit that includes one or a combination of, for example, hardware, software or firmware. The term 'module' may be interchangeably used with the terms such as, for example, unit, logic, logical block, component or circuit. The module may be the minimum unit of a component that is configured as a single body, or a part thereof. The module may be the minimum unit that performs one or more functions, or a part thereof. The module may be implemented mechanically or electronically. For example, the module may include at least one of an Application-Specific Integrated Circuit (ASIC) chip, a Field-Programmable Gate Arrays (FPGAs) chip or a programmable-logic device, which have been known, or will be developed in the future, and which may perform any operations.

At least a portion of the device (modules or their functions) or method (operations) according to various embodiments of the present disclosure may be implemented by, for example, a command that is stored in a computer-readable storage media in the form of a programming module. If the command is executed by at least one processor (e.g., the processor 120), the at least one processor may perform a function corresponding to the command. The computer-readable storage media may be, for example, the memory 130. At least a portion of the programming module may be implemented (e.g., executed) by, for example, the processor 120. At least a portion of the programming module may include, for example, a module, a program, a routine, a set of instructions, or a process, for performing one or more functions.

The computer-readable storage media may include magnetic media (e.g., a hard disk, a floppy disk and magnetic tape), optical media (e.g., compact disc read only memory (CD-ROM) and digital versatile disc (DVD)), magneto-optical media (e.g., floptical disk), and a hardware device (e.g., read only memory (ROM), random access memory (RAM) or flash memory), which is specifically configured to store and execute a program command (e.g., a programming module). In addition, the program command may include not only the machine code made by the compiler, but also the high-level language code that can be executed by the computer using the interpreter and the like. The hardware device may be configured to operate as one or more software modules to perform the operations according to various embodiments of the present disclosure, and vice versa.

According to various embodiments of the present disclosure, a computer-readable recording medium storing a program to be performed in a computer may be provided. The program may include an executable instruction that, when is executed by a processor, allows the processor to perform an operation of measuring a voltage of power that is input to a power supply terminal of an interface connector that includes the power supply terminal and is configured to connect with an external device, and an operation of identifying a type of the external device connected to the interface connector based on the voltage of the input power.

An electronic device according to various embodiments of the present disclosure may receive and store a program including instructions for allowing the electronic device to perform the method of identifying an external device, from a program server that is connected to the electronic device by wires or wirelessly. The electronic device or the server shown in FIG. 1 may be the program server. The program serer may include a memory for storing the program, a communication module for performing wired/wireless communication with the electronic device, and a processor for transmitting the program to the electronic device automatically or upon request of the electronic device.

The module or programming module according to various embodiments of the present disclosure may include at least one of the above-described components, some of which can be omitted, or may further include other additional components. The operations performed by the module, the programming module or other components according to various embodiments of the present disclosure may be performed in a sequential, parallel, iterative or heuristic manner. In addition, some operations may be performed in a different order, or omitted, or other operations may be added.

As is apparent from the foregoing description, according to various embodiments of the present disclosure, the electronic device may identify the type of the external device based on a voltage of the power that is input to the power supply terminal of the interface connector. Therefore, the electronic device may identify the type of the external device connected to the electronic device, while connecting the electronic device and the external device with each other using the interface connector that does not include an ID terminal.

According to various embodiments of the present disclosure, the electronic device may determine whether the type of the external device connected to the electronic device is a process test tool, based on a voltage of the power that is input to the power supply terminal of the interface connector. Therefore, the electronic device may determine whether the type of the external device connected to the electronic device is a process test tool, while connecting the electronic device and the external device with each other using the interface connector that does not include an ID terminal.

According to various embodiments of the present disclosure, if the external device is not identified as a process test tool, the electronic device may identify the type of an external device other than the process test tool depending on whether the communication terminals of the interface connector are short-circuited with each other.

According to various embodiments of the present disclosure, if the external device is not identified as a process test tool, the electronic device may identify the type of the external device other than the process test tool depending on whether the communication terminals of the interface connector are short-circuited with each other, and on a resistance of the resistor connected to the communication terminals of the interface connector.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

What is claimed is:

1. A method for identifying an external device in an electronic device, the method comprising:
   measuring a voltage of power that is input to a power supply terminal of an interface connector that includes the power supply terminal and is configured to connect with an external device; and
   identifying a type of the external device connected to the interface connector based on the voltage of the input power,
   wherein identifying the type of the external device includes:
   identifying the external device as a process test tool, if the voltage of the input power is less than a threshold;
   identifying the external device as a device other than the process test tool, if the voltage of the input power is greater than or equal to the threshold;
   determining whether communication terminals of the interface connector are short-circuited with each other, if the external device is the device other than the process test tool; and
   identifying the external device as a device capable of communication through the interface connector, if the communication terminals are not short-circuited with each other.

2. The method of claim 1, wherein identifying the type of the external device further includes:
   identifying the external device as a charging device, if the communication terminals are short-circuited with each other.

3. The method of claim 1, wherein identifying the type of the external device further includes:
   measuring a voltage corresponding to a resistance of a resistor connected to the communication terminals in the external device, if the communication terminals are short-circuited with each other; and
   identifying the type of the external device based on the voltage corresponding to the resistance.

4. The method of claim 3, wherein the resistance of the resistor is different depending on the type of the external device.

5. The method of claim 1, wherein the interface connector is a 4-pin interface connector that includes the power supply terminal, two communication terminals, and a ground terminal.

6. An electronic device comprising:
   an interface connector that includes a power supply terminal and is configured to connect with an external device; and
   a controller configured to:
   measure a voltage of power that is input to the power supply terminal;
   identifying the external device as a process test tool if the voltage of the input power is less than a threshold;
   identifying the external device as a device other than the process test tool if the voltage of the input power is greater than or equal to the threshold;
   determining whether communication terminals of the interface connector are short-circuited with each other if the external device is the device other than the process test tool; and
   identifying the external device as a device capable of communication through the interface connector if the communication terminals are not short-circuited with each other.

7. The electronic device of claim 6,
   wherein the controller is further configured to identify the external device as a charging device if the communication terminals are short-circuited with each other.

8. The electronic device of claim 7, further comprising an analog-to-digital converter (ADC) that converts the voltage of the input power into a digital value and provides the digital value to the controller.

9. The electronic device of claim 6,
wherein the controller is further configured to identify a type of the external device based on a voltage corresponding to a resistance of a resistor connected to the communication terminals in the external device if the communication terminals are short-circuited with each other.

10. The electronic device of claim 9, wherein the resistance of the resistor is different depending on the type of the external device.

11. The electronic device of claim 9, further comprising:
a first ADC configured to convert the voltage of the input power into a digital value and provide the digital value to the controller; and
a second ADC configured to convert the voltage corresponding to the resistance into a digital value, and provide the digital value to the controller.

12. The electronic device of claim 6, wherein the controller is an application processor (AP) of the electronic device.

13. The electronic device of claim 6, wherein the interface connector is a 4-pin interface connector that includes the power supply terminal, two communication terminals, and a ground terminal.

14. A non-transitory computer-readable recording medium storing a program to be performed in a computer, wherein the program includes an executable instruction that, when is executed by a processor, cause the processor to perform operations comprising:
measuring a voltage of power that is input to a power supply terminal of an interface connector that includes the power supply terminal and is configured to connect with an external device; and
identifying a type of the external device connected to the interface connector based on the voltage of the input power,
wherein identifying the type of the external device includes:
identifying the external device as a process test tool, if the voltage of the input power is less than a threshold;
identifying the external device as a device other than the process test tool, if the voltage of the input power is greater than or equal to the threshold;
determining whether communication terminals of the interface connector are short-circuited with each other, if the external device is the device other than the process test tool; and
identifying the external device as a device capable of communication through the interface connector, if the communication terminals are not short-circuited with each other.

* * * * *